(12) United States Patent
Nandy et al.

(10) Patent No.: US 12,457,125 B1
(45) Date of Patent: Oct. 28, 2025

(54) ENHANCED MULTICAST TRACING WITH LATENCY DETECTION

(71) Applicant: HEWLETT PACKARD ENTERPRISE DEVELOPMENT LP, Spring, TX (US)

(72) Inventors: Tathagata Nandy, Bangalore (IN); Chethan Chavadibagilu Radhakrishnabhat, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 2 days.

(21) Appl. No.: 18/754,543

(22) Filed: Jun. 26, 2024

(30) Foreign Application Priority Data

Apr. 30, 2024 (IN) .............................. 202441034178

(51) Int. Cl.
*H04L 12/18* (2006.01)
*H04L 43/0864* (2022.01)
*H04L 43/106* (2022.01)

(52) U.S. Cl.
CPC .......... *H04L 12/18* (2013.01); *H04L 43/0864* (2013.01); *H04L 43/106* (2013.01)

(58) Field of Classification Search
CPC .... H04L 12/18; H04L 43/0864; H04L 43/106
See application file for complete search history.

(56) References Cited

U.S. PATENT DOCUMENTS

| | | | | |
|---|---|---|---|---|
| 6,816,966 B1 * | 11/2004 | Gupta | ................. | H04L 9/3271 |
| | | | | 713/163 |
| 9,712,334 B2 * | 7/2017 | Jain | ....................... | H04L 45/16 |
| 2012/0033667 A1 * | 2/2012 | Venkataraman | ......... | H04L 45/16 |
| | | | | 370/390 |
| 2023/0126874 A1 * | 4/2023 | Nandy | ............... | H04N 21/4384 |
| | | | | 725/116 |
| 2024/0214295 A1 * | 6/2024 | Mishra | ..................... | H04L 45/02 |

OTHER PUBLICATIONS

Aruba, "High Availability From Campus to Data Center Aruba Virtual Switching Extension (VSX)", 2021, 4 Pages.
Asaeda et al., "Mtrace Version 2: Traceroute Facility for IP Multicast", Request for Comments: 8487, Oct. 2018, 41 pages.

(Continued)

*Primary Examiner* — Jerry B Dennison
(74) *Attorney, Agent, or Firm* — Hewlett Packard Enterprise Patent Department

(57) ABSTRACT

A multicast tracing system for a network is provided. During operation, the system can identify, at a network device in the network, a join request and a data packet of a multicast group received at the network device. The system can determine respective timestamps indicating the arrival and departure of the join request and the data packet. The system can then determine, based on the timestamps, at least a local latency incurred by the data packet at the network device and a network latency incurred by the data packet in the network. Subsequently, the system can receive a multicast trace (mtrace) request for the multicast group. The system can incorporate the local latency and the network latency into the mtrace request. Upon identifying an upstream network device in a multicast path associated with the multicast group, the system can forward the mtrace request to the upstream network device.

20 Claims, 8 Drawing Sheets

(56) References Cited

OTHER PUBLICATIONS

Broadcom, "Network Performance Anomaly detection with In-band Flow Analyzer (IFA)", available online at <https://www.broadcom.com/blog/network-performance-anomaly-detection-with-in-band-flow-analyzer>, May 11, 2023, 4 pages.

Claise et al., "Specification of the IP Flow Information Export (IPFIX) Protocol for the Exchange of Flow Information", Request for Comments: 7011, Sep. 2013, 76 pages.

Mahalingam et al., "Virtual extensible Local Area Network (VXLAN): A Framework for Overlaying Virtualized Layer 2 Networks over Layer 3 Networks", Request for Comments: 7348, Aug. 2014, 22 pages.

\* cited by examiner

ENHANCED MULTICAST TRACING WITH LATENCY DETECTION

BACKGROUND

A network device, such as a switch, in a network may support different protocols and services. For example, the network device can support one or more multicast protocols to facilitate the distribution of certain classes of traffic, such as video streaming. Some streaming platforms, such as Internet Protocol Television (IPTV), can rely on multicast to distribute video streams to clients.

BRIEF DESCRIPTION OF THE FIGURES

In the figures, like reference numerals refer to the same figure elements.

DETAILED DESCRIPTION

Figure 1:
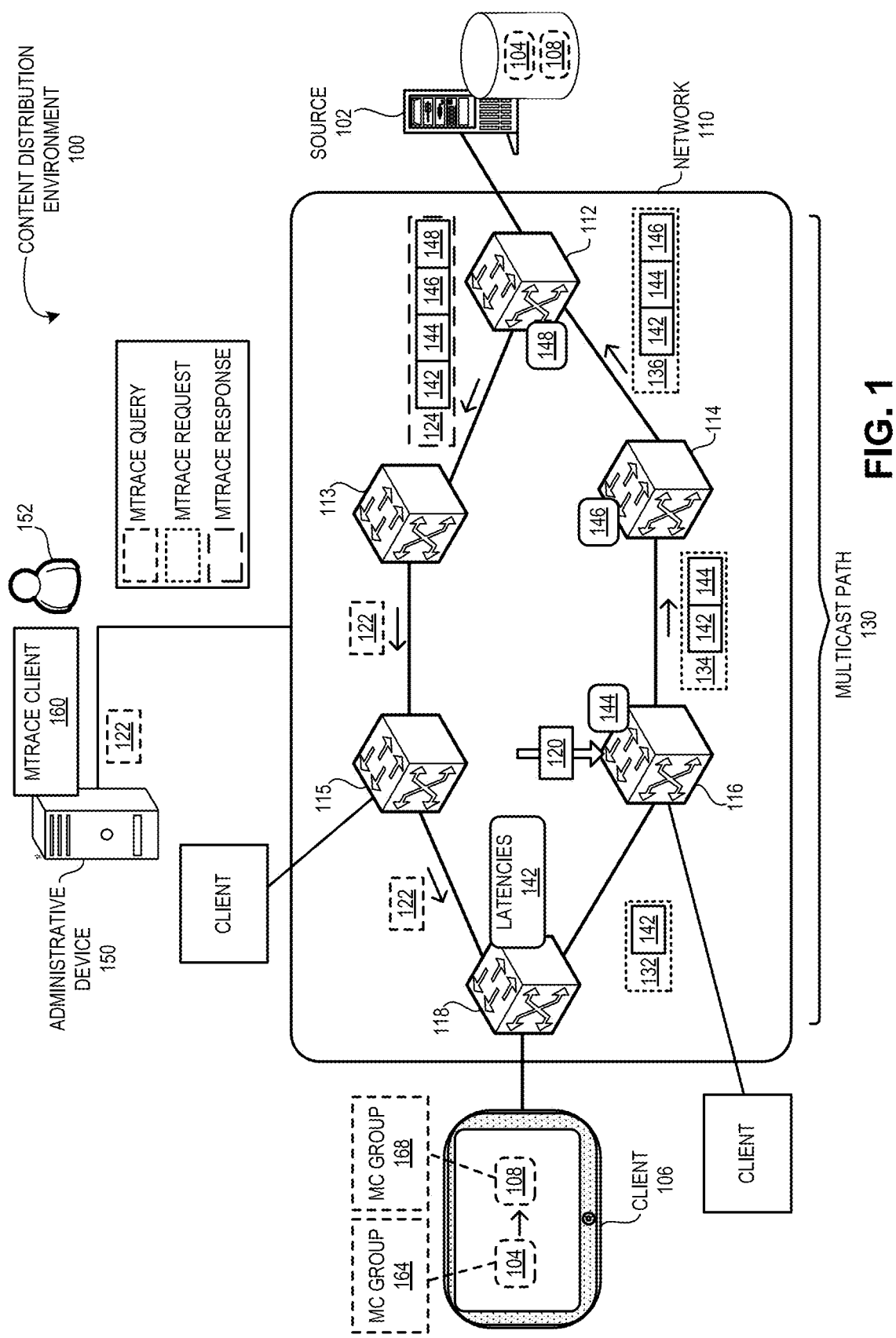
FIG. 1 illustrates an example of latency detection based on enhanced multicast tracing in a network, in accordance with an aspect of the present application.

A multicast protocol, such as Protocol-Independent Multicast (PIM), can distribute multicast traffic flows from a source to a set of clients requesting the multicast traffic. Because IPTV video streams are distributed from a source to a number of subscribers, the multicast protocol can be used to distribute the IPTV streams. In particular, the multicast protocol can distribute the multicast flow of a multicast group via one or more network devices to the requesting clients. For example, a first-hop network device (FHND) coupling the source can obtain a multicast packet of the multicast group from the source and forward it to an upstream network device. The forwarding can continue until the multicast packet reaches a requesting client via a last-hop network device (LHND) coupling the client.

The network path between the FHND and the LHND can be referred to as the multicast path of the multicast group. Allocating resources, such as bandwidth, in the multicast path can be useful for efficiently distributing multicast flows. For example, if a network administrator can identify which network devices in the network are forwarding IPTV streaming, the administrator can allocate resources for the network devices accordingly. However, determining how well the allocated resources are performing at handling the multicast flows can be challenging.

The aspects described herein address the problem of determining latencies incurred by a multicast flow at the network devices by (i) determining respective arrival and departure timestamps of critical multicast packets at a respective network device; (ii) determining local latency, network latency, and round-trip latency at the network device based on the timestamps; and (iii) incorporating the determined latencies into an mtrace request packet at the network device. Because the request packet can be forwarded on a multicast path (e.g., from the LHND to the FHND), the request packet can accumulate the latencies of a respective network device on the path. By inspecting the latencies indicated in the request packet, an administrator can determine how well the network devices on the path are performing.

Currently, a video streaming platform, such as an IPTV service provider, can offer a number of video streams to clients. Since different sets of clients may choose to receive different video streams, each of these video streams can be distributed via a corresponding multicast flow. This allows the video stream to be distributed from a source, such as a distribution server, to the corresponding set of clients. Hence, different channels are distributed among the clients via different multicast groups representing the multicast flows. The channels can be allocated to corresponding multicast groups manually (e.g., by an administrator) or dynamically (e.g., from a range of pre-selected multicast groups). The dynamic allocation can be based on an allocation process, such as sequential allocation or random allocation. Subsequently, a respective channel can be mapped to the corresponding multicast group.

When a client tunes to a channel, the client can send a client join request, such as an Internet Group Management Protocol (IGMP) or Multicast Listener Discovery (MLD) join request, for the multicast group associated with the channel. Upon receiving the client join request, the LHND can send a corresponding network join request, such as a PIM join, for the multicast group. The LHND can then start receiving the video streaming of the channel via the associated multicast flow, which can then be forwarded to the client. However, when the client changes a channel, the client may receive the corresponding video stream from a new multicast flow associated with a different multicast group. Accordingly, the client may send a new client join request to the LHND. If no other client coupled to the LHND has subscribed to the multicast group, the LHND may need to send a new network join request for the new multicast group. Subsequently, the LHND can start receiving the video streaming of the new channel, which can then be forwarded to the client.

Thus, the process of switching multicast groups may involve exchanging control and data packets. If there is congestion on a link or network device on the multicast path, the packets can be delayed or lost. Consequently, the client may observe a lag in the channel-changing experience, thereby experiencing degraded performance. Hence, it can be necessary to identify the network device causing the delay on the multicast path. However, existing tools supporting multicast path tracing (or multicast tracing), such as mtrace, may not support latency detection at individual hops (i.e., the network devices) of the multicast path. As a result, in a complex network, isolating a particular network device causing delay may involve manually checking individual network devices and can be time intensive.

To address this problem, mtrace can be enhanced to incorporate latency information associated with a respective network device on the multicast path. During operation, a respective network device can run a flow sampling mechanism, such as the Internet Protocol (IP) Flow Information Export (IPFIX). The sampling mechanism can sample packets associated with the multicast group. For example, the packet sampling mechanism can detect join requests and the initial data packet of the multicast group. Based on the detection, the network device can identify the join request and the data packet. The network device can determine respective timestamps when these packets arrive and leave the network device. Based on the timestamps, the network device can determine a set of latencies associated with the multicast group.

The set of latencies can include a local latency, a network latency, and a round-trip latency. The local latency can indicate the delay incurred within the network device (e.g., due to the transmission delay, which is the delay incurred by a packet while being transmitted from the network device via an egress link). If the queue of the network device incurs high congestion, the local latency can be high. The network latency can indicate the total time taken for each of the upstream network devices on the multicast path to process the join request and subsequently send the data packet to the network device. The join request can be an IGMP join, an MLD join, or a PIM join. Therefore, the network latency can indicate the delay for which the network is responsible. Furthermore, the round-trip latency can incorporate both the local and network latencies to indicate the overall delay of the upstream network segment for that particular network device. The round-trip latency can indicate the total time taken by the network device to receive a join request associated with a client and forward the corresponding data packet to the client.

If an administrator receives a complaint regarding the experience of an IPTV client, the administrator can initiate an enhanced multicast tracing that incorporates the latencies recorded at the network devices. In other words, if the quality of experience associated with a video stream received via a multicast path is diminished, the multicast tracing can be initiated by the administrator on the multicast path. Accordingly, the administrator can issue an mtrace command to the mtrace client running on an administrative device from which the network can be provisioned and managed. The administrative device can be any device from which a network device can be accessed and configured. The mtrace client can be an application or daemon running on the administrative device.

Based on the mtrace command, the mtrace client running on the administrative device can send an mtrace query. The inputs to the mtrace query can include the respective IP addresses of the source, the LHND, and the multicast group. The administrative device can then forward the mtrace query to the LHND for the multicast group. Upon receiving the mtrace query, the LHND can generate an mtrace request and include a Standard Response Block (SRB) into the mtrace request. The SRB block can include the IP address of the LHND and the multicast protocol information of the multicast group at the LHND. The SRB block may also include multicast packet statistics, which can include the number of bytes received, forwarded, and dropped at the LHND.

In addition to the SRB, the LHND can also include the local latencies calculated at the LHND in the mtrace request. In some examples, the LHND can include the latencies in an Augmented Response Block (ARB) of the mtrace request. The ARB can be supported by the mtrace process to incorporate flexible diagnostic information. The LHND can then use the local routing information to identify the upstream network device on the multicast path (i.e., toward the source) and forward the multicast request to the identified network device. The network device can receive the mtrace request and update the mtrace request with local information of the network device. Updating the mtrace request can include appending the local SRB and latencies (e.g., in a corresponding ARB) into the mtrace request.

Subsequently, the network device can forward the updated mtrace request further upstream. This process is repeated at a respective hop of the multicast path until the mtrace request reaches the FHND. The FHND can receive the mtrace request and update it with the local information of the FHND. At this point, the mtrace request has accumulated information associated with a respective network device on the multicast path. The FHND can generate an mtrace reply comprising the accumulated information and send the mtrace reply to the mtrace client originating the multicast tracing. The mtrace client can display the accumulated information (e.g., on a user interface to the user). In this way, the enhanced mtrace process can present latencies observed at individual network devices of the multicast path. This allows an administrator to identify locations, if any, that are facing congestion.

In this disclosure, the term "network device" is used in a generic sense, and it can refer to any standalone network device or fabric switch operating in any network layer. "Network device" should not be interpreted as limiting examples of the present invention to a particular network layer. Any device that can forward traffic to an external device or another device in the network can be referred to as a "network device." Furthermore, if the network device facilitates communication between networks, the switch can be referred to as a gateway. Therefore, any physical or virtual device (e.g., a virtual machine or switch operating on a computing device) that can operate in a network and forward traffic to an end device can be referred to as a "network device." If the network device is a virtual device, the switch can be referred to as a virtual device. Examples of a "network device" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an example of latency detection based on enhanced multicast tracing in a network, in accordance with an aspect of the present application. A content distribution environment 100 can operate as a video streaming platform, such as an IPTV service provider. For example, environment 100 can allow a client 106 to obtain video streams 104 and 108 from a source 102 (e.g., a server) via a network 110. Here, video streams 104 and 108 can be IPTV channels. Therefore, video streams 104 and 108 can also be referred to as channels 104 and 108, respectively. Channels 104 and 108 can be distributed to the clients via multicast groups 164 and 168, respectively. A respective channel can be mapped to a corresponding multicast group based on manual or dynamic allocation. For the manual allocation, an administrator 152 can allocate multicast groups 164 and 168 to channels 104 and 108, respectively. Administrator 152 may perform the allocation at administrative device 150 from which network 110 can be provisioned and managed. Administrative device 150 may also perform dynamic allocation by executing an allocation process that can select multicast groups 164 and 168 to be allocated to channels 104 and 108, respectively. Examples of the allocation process can include, but are not limited to, sequential allocation and random allocation. The allocation information can then be propagated from administrative device 150 to the sources and clients in environment 100.

Network 110 can include a number of network devices 112, 113, 114, 115, 116, and 118. Because channel 104 can be distributed from source 102 to a number of clients, channel 104 can be distributed using a multicast protocol, such as PIM. In this example, network devices 112 and 118 are coupled to source 102 and client 106, respectively. Therefore, network devices 112 and 118 can be the FHND and LHND, respectively. In network 110, the shortest path between network devices 112 and 118 in network 100 can be via network devices 114 and 116. Hence, multicast path 130 between source 102 and client 106 can include network devices 112, 114, 116, and 118. When client 106 tunes to channel 104, client 106 can send a client join request (e.g., an IGMP or MLD join) for multicast group 164 associated with channel 104. Upon receiving the client join request, LHND 118 can send a corresponding network join request, such as a PIM join, for multicast group 164.

LHND 118 can then start receiving the video streaming of channel 104 via the associated multicast flow, which can then be forwarded to client 106. However, when client 106 changes to a different channel 108, client 106 may receive the corresponding video stream from a new multicast flow associated with a different multicast group 168. Accordingly, client 106 may send a new client join request to LHND 118, which can then send a new network join request for multicast group 168. Subsequently, LHND 118 can start receiving the video streaming of channel 108, which can then be forwarded to client 106.

Therefore, client 106 switching from channel 104 to channel 108 can include switching from multicast group 164 to multicast group 168 by exchanging control and data packets with LHND 118, which in turn, can exchange control and data packets with upstream network devices of the multicast path. Suppose that there is congestion 120 in network device 116. Congestion 120 can include the utilization of the queues of network device 116 reaching a threshold (e.g., at eighty percent utilization). Therefore, the join requests and data packets associated with channel 108 can be delayed or lost. Consequently, client 106 may observe a lag while changing to channel 106, which can degrade the quality of experience for client 106. Hence, it can be necessary to identify network device 116 causing the delay in multicast path 130. However, existing tools, such as mtrace, that facilitate multicast tracing, may not support latency detection at individual network devices of multicast path 130. As a result, in network 100, isolating a particular network device causing delay may involve manually checking individual network devices and can be time intensive.

To address this problem, mtrace can be enhanced to incorporate latency information associated with a respective network device on multicast path 130. During operation, network devices in network 110 can run a flow sampling mechanism, such as the IPFIX, to detect join requests and initial data packets of multicast groups 164 and 168. The network devices can determine respective timestamps when these packets arrive and leave. For example, network device 116 can determine respective timestamps when a join request is received from LHND 118 and sent to network device 114. Similarly, network device 116 can determine respective timestamps when the initial data packet is received from network device 114 and sent to LHND 118. Based on the timestamps, network device 116 can determine a set of latencies associated with multicast group 168. The set of latencies can include a local latency, a network latency, and a round-trip latency experienced at network 116.

If administrator 152 receives a complaint regarding the experience of client 106, administrator 152 can initiate an enhanced multicast tracing that incorporates the latencies recorded at network devices 112, 114, 116, and 118. Here, the experience of client 106 indicates the diminished quality of a video stream transported via multicast path 130. In other words, the performance of at least a subset of network devices 112, 114, 116, and 118 may cause extensive delay in network 110, which can lead to the diminished experience of client 106. Administrator 152 can issue an mtrace command to mtrace client 160 running on administrative device 150. Administrative device 150 can be coupled to one or more network devices of network 110, such as network device 113. When an instruction is sent from administrative device 150, the instruction can be sent to network device 113, which can then forward the instruction to the intended destination.

Mtrace client 160 can be an application or daemon running on administrative device 150. Administrator 152 may also initiate the multicast tracing upon receiving a notification indicating congestion in network 110. For example, when network device 116 on multicast path 130 experiences packet drops, which may or may not be a packet associated with channels 104 and 108, network device 116 can send a warning notification to administrative device 150. Based on the mtrace command from administrator 152, mtrace client 160 can send an mtrace query 122. The inputs to mtrace query 122 can include the respective IP addresses of source 102, LHND 118, and multicast group 168. Administrative device 150 can then forward mtrace query 122 to network 110. Network device 113 can receive mtrace query 122 and send it to LHND 118 of multicast path 132.

Upon receiving mtrace query 122, LHND 118 can generate an mtrace request 132 and include the local SRB into mtrace request 132. The SRB block can include the IP address of LHND 118 and the multicast protocol of multicast group 168 (e.g., PIM). The SRB block may also include multicast packet statistics, which can include the number of bytes received, forwarded, and dropped at LHND 118. In addition to the SRB, LHND 118 can also include latencies 142 calculated at LHND 118 in mtrace request 132. In some examples, LHND 118 can include latencies 142 in an ARB of mtrace request 132. LHND 118 can then use the local routing information to identify network device 116 as the upstream device on multicast path 132 and forward multicast request 132 to network device 116. Network device 116 can receive mtrace request 132 and generate an updated mtrace request 134 by appending the local SRB and latencies 144 into mtrace request 132.

Network device 116 can forward mtrace request 134 further upstream on multicast path 130 to network device 114. Network device 114 can then generate an updated mtrace request 136 by appending the local SRB and latencies 146 into mtrace request 134. This process is repeated at a respective hop of multicast path 132 until mtrace request 136 reaches FHND 112. FHND 112 can incorporate with the local SRB and latencies 148. FHND 112 can generate an mtrace reply 124 comprising the accumulated information, which can include latencies 142, 144, 146, and 148 calculated at network devices 118, 116, 114, and 112, respectively. FHND 112 can send mtrace reply 124 to mtrace client 160 via network device 113. Mtrace client 160 can then display latencies 142, 144, 146, and 148 to administrator 152 (e.g., on a user interface of administrative device 150). In this way, the enhanced multicast tracing can present latencies 142, 144, 146, and 148 observed on multicast path 130. This allows administrator 152 to determine that network device 116 is incurring a high latency (e.g., due to congestion 120). Administrator 152 can then perform a corrective action, such as rerouting some data flows via other network devices (e.g., network devices 113 and 115) to reduce congestion 120.

Figure 2:
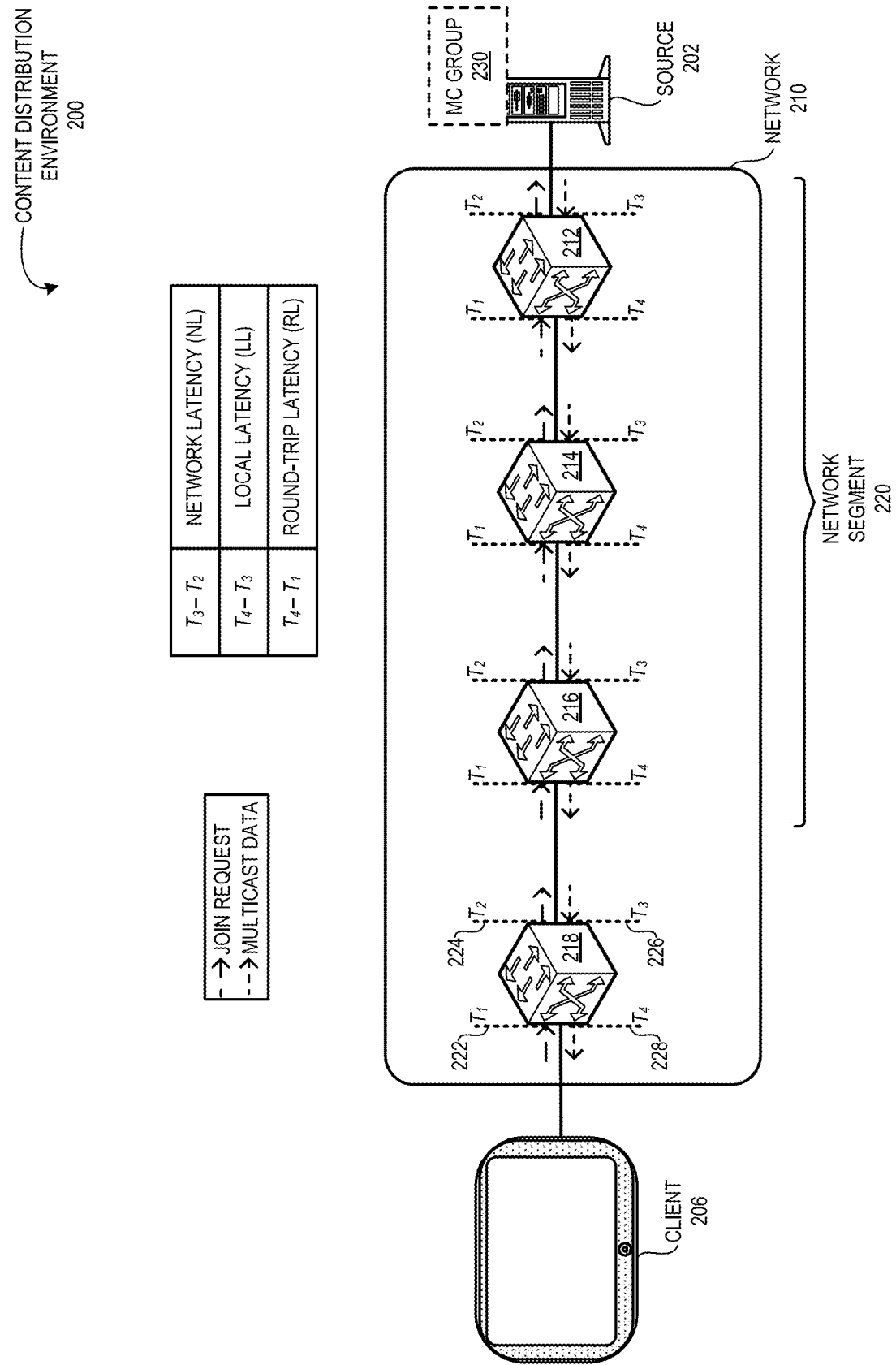
FIG. 2 illustrates an example of network devices determining latencies associated with a multicast group for facilitating enhanced multicast tracing in a network, in accordance with an aspect of the present application.

FIG. 2 illustrates an example of network devices determining latencies associated with a multicast group for facilitating enhanced multicast tracing in a network, in accordance with an aspect of the present application. A content distribution environment 200 can operate as a video streaming platform, such as an IPTV service provider. For example, environment 200 can allow a client 206 to obtain the video streams from a source 202 (e.g., a server) via a network 210. For example, client 206 can obtain a video stream associated with a multicast group 230 from source 202. Network 210 can include a number of network devices 212, 214, 216, and 218. In this example, network devices 212 and 218 are coupled to source 202 and client 206, respectively. Therefore, network devices 212 and 218 can be the FHND and LHND, respectively. Here, the multicast path between source 202 and client 206 can include network devices 212, 214, 216, and 218.

During operation, a respective network device of network 210 can run a flow sampling mechanism, such as the IPFIX, to identify join requests and initial data packets of a respective multicast group. At a respective network device, a set of timestamps, which can include timestamps $T_1$, $T_2$, $T_3$, and $T_4$, can be determined. Timestamp $T_1$ can indicate the time when a join request is received on a port for multicast group 230. This information can be obtained by ingress sampling through an interface coupling a downstream device (e.g., a client device or a downstream network device). Ingress sampling is performed on the packets received via the interface. Timestamp $T_2$ can indicate the time when the join request is transmitted from the network device. This information can be obtained by egress sampling through an interface coupling an upstream device (e.g., a source or an upstream network device). Ingress sampling is performed on the packets transmitted via the interface. Timestamp $T_3$ can indicate the time when a multicast data packet of multicast group 230 is received at the network device. This information can be obtained by ingress sampling through the interface coupling the upstream device. Timestamp $T_4$ can indicate the time when the multicast data packet is transmitted from the network device. This information can be obtained by egress sampling through an interface coupling a downstream device. Based on timestamps $T_1$, $T_2$, $T_3$, and $T_4$, a set of latencies associated with multicast group 230 can be determined.

The set of latencies can include a local latency or LL, a network latency or NL, and a round-trip latency or RL. For example, network device 218 can determine timestamps 222, 224, 226, and 228 corresponding to timestamps $T_1$, $T_2$, $T_3$, and $T_4$, respectively. The local latency can be calculated as $(T_4-T_3)$. Therefore, network device 218 can determine its local latency as (timestamp 228-timestamp 226). The local latency can indicate the delay incurred within network device 218 due to the transmission and queueing delay of the multicast data packet. If the queue of network device 218 incurs high congestion, the local latency can be high.

The network latency can be calculated as $(T_3-T_2)$. Hence, network device 218 can determine its network latency as (timestamp 226-timestamp 224). The network latency can indicate the time taken for upstream network devices 216, 214, and 212 to process the join request and send the data packet to network device 218. Therefore, the network latency can indicate the delay for which network 210 is responsible. Furthermore, the round-trip latency can be calculated as $(T_4-T_1)$. Accordingly, network device 218 can determine its round-trip latency as (timestamp 228 timestamp 222). The round-trip latency can incorporate both the local and network latencies to indicate the overall delay of upstream network segment 220 for network device 218. The round-trip latency can indicate the total time taken by network device 218 to receive a join request associated with client 206 and forward the corresponding data packet to client 206.

Figure 3:
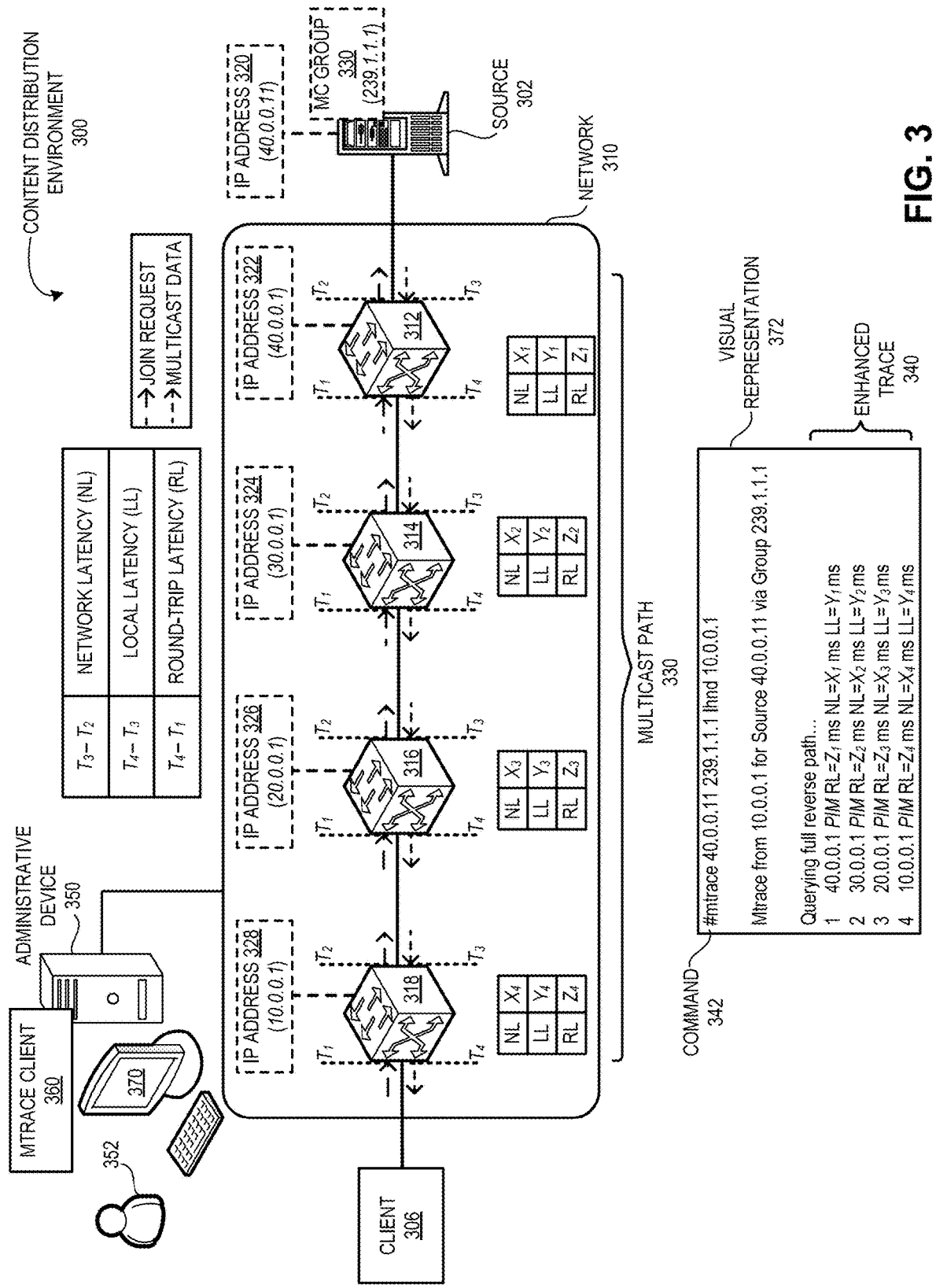
FIG. 3 illustrates an example of using enhanced multicast trace (mtrace) in a network to determine respective latencies at a respective hop of a multicast path, in accordance with an aspect of the present application.

FIG. 3 illustrates an example of using enhanced multicast trace (mtrace) in a network to determine respective latencies at a respective hop of a multicast path, in accordance with an aspect of the present application. A content distribution environment 300 can operate as a video streaming platform, such as an IPTV service provider. For example, environment 300 can allow a client 306 to obtain the video streams from a source 302 (e.g., a server) via a network 310. For example, client 306 can obtain a video stream associated with a multicast group 330 from source 302. Network 310 can include a number of network devices 312, 314, 316, and 318. In this example, network devices 312 and 318 are coupled to source 302 and client 306, respectively. Therefore, network devices 312 and 318 can be the FHND and LHND, respectively.

Here, multicast path 330 between source 302 and client 306 can include network devices 312, 314, 316, and 318. Source 302 and network devices 312, 314, 316, and 318 can be associated with IP addresses 320, 322, 324, 326, and 328, respectively. In this example, IP addresses 320, 322, 324, 326, and 328 can be 40.1.1.11, 40.0.0.1, 30.0.0.1, 20.0.0.1, and 10.0.0.1, respectively. Multicast group 330 can be associated with a multicast address 239.1.1.1.

A respective network device of network 310 can run a flow sampling mechanism, such as the IPFIX, to identify join requests and initial data packets of a respective multicast group. At a respective network device, a set of timestamps, which can include timestamps $T_1$, $T_2$, $T_3$, and $T_4$, can be determined. Based on timestamps $T_1$, $T_2$, $T_3$, and $T_4$, a set of latencies associated with multicast group 330 can be determined at a respective network device. The set of latencies can include a local latency or LL, a network latency or NL, and a round-trip latency or RL. The network, local, and round-trip latencies for multicast group 330 at network device 312 can be $X_1$, $Y_1$, and $Z_1$, respectively. The latencies can be measured in a unit of time, such as milliseconds. Similarly, the network, local, and round-trip latencies at network device 314 can be $X_2$, $Y_2$, and $Z_2$, respectively; the network, local, and round-trip latencies at network device 316 can be $X_3$, $Y_3$, and $Z_3$, respectively; and the network, local, and round-trip latencies at network device 318 can be $X_4$, $Y_4$, and $Z_4$, respectively.

During operation, administrator 352 can initiate an enhanced multicast tracing that incorporates the latencies recorded at network devices 312, 314, 316, and 318. Administrator 352 can issue an mtrace command to mtrace client 360 running on administrative device 350 from which network 310 can be provisioned and managed. Based on an mtrace command 342 from administrator 352, mtrace client 360 can send an mtrace query. The parameters to mtrace command 342 can include IP address 320 (40.0.0.11) and the address of multicast group 330 (239.1.1.1). Mtrace command 342 can also identify the LHND (i.e., LHND 322) based on its IP address 328 (10.0.0.1).

The multicast tracing can collect IP addresses and latencies at a respective network device of multicast path 330. As a result, when the mtrace is complete and a multicast response is returned to mtrace client 360, an enhanced trace 340 comprising latency information of network devices 312, 314, 316, and 318 can be available to mtrace client 360. Mtrace client 360 can then display the corresponding network, local, and round-trip latencies associated with IP addresses 40.0.0.1, 30.0.0.1, 20.0.0.1, and 10.0.0.1 to administrator 352. Mtrace client 360 can present latencies in a visual representation 372 via a user interface 370 on a display device (e.g., a monitor) of administrative device 350. For example, user interface 370 can show network, local, and round-trip latencies for multicast group 330 at IP address 10.0.0.1 can be $X_4$, $Y_4$, and $Z_4$, respectively.

If $Y_4$ is high, administrator 352 can determine that network device 328 is not efficiently operating. This can be due to congestion in the queues or inefficient packet processing due to the heavy processing load on the processor of network device 322. If network device 328 is configured as a layer-2 multicast querier for a virtual local area network (VLAN), administrator 352 can also infer that other clients in the VLAN may have experienced degraded performance. On the other hand, if $X_4$ is high, administrator 352 can determine that, even though network device 322 is operating efficiently, there might be an issue in the upstream segment of multicast path 330. Administrator 352 can then further inspect the latencies of network devices 324, 326, and 328 to isolate the origin of the issue. If the latency values are within the expected range but a video streaming is experiencing an issue, administrator 352 can determine that there can be an issue with the streaming (e.g., at source 302). In this way, the enhanced multicast tracing can present the latencies observed on multicast path 330, which allows administrator 352 to determine which element of network 310 may have caused an issue.

Figure 4A:
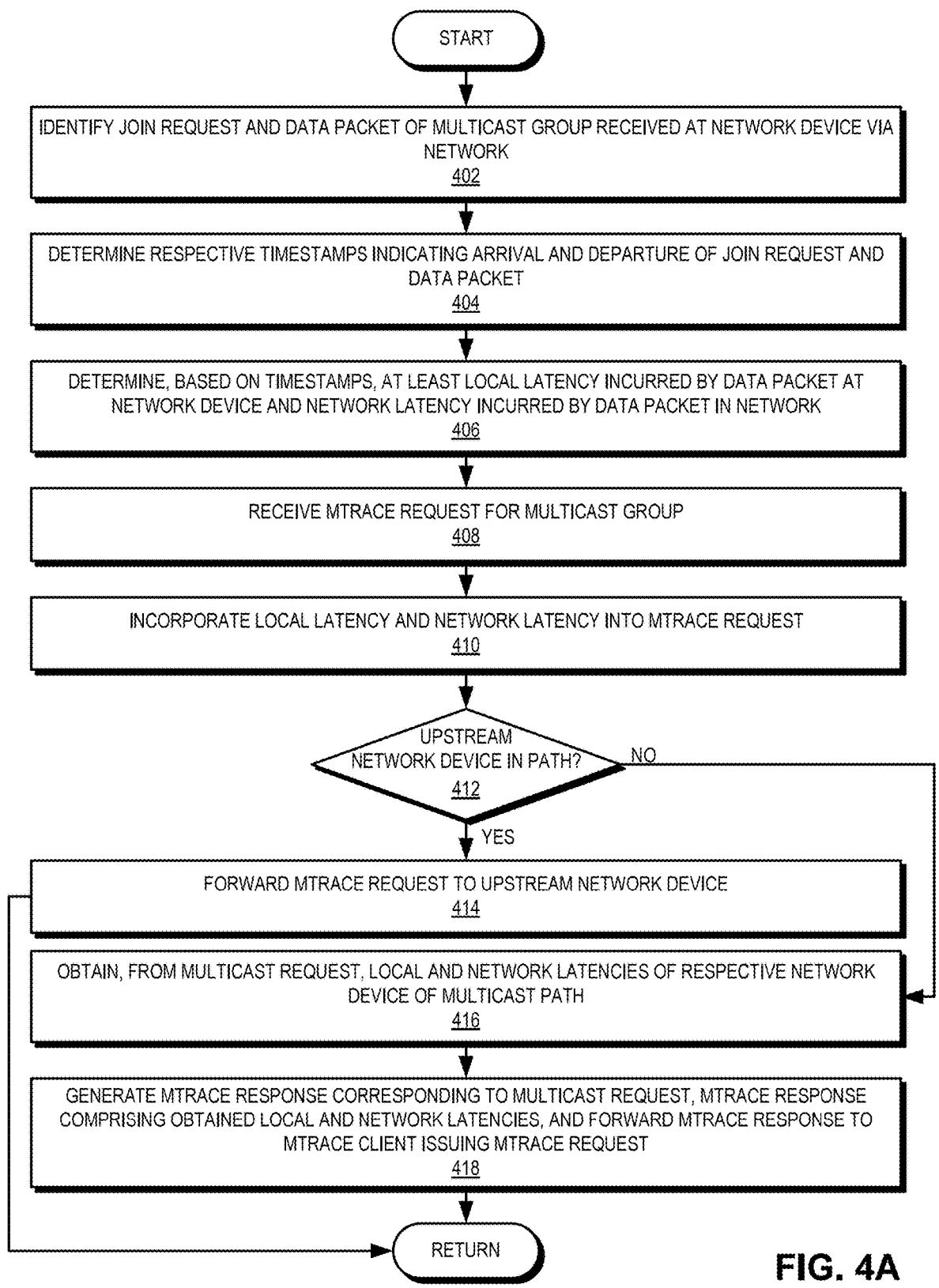
FIG. 4A presents a flowchart illustrating the process of a network device facilitating latency detection based on enhanced multicast tracing in a network, in accordance with an aspect of the present application.

FIG. 4A presents a flowchart illustrating the process of a network device facilitating latency detection based on enhanced multicast tracing in a network, in accordance with an aspect of the present application. During operation, the network device can identify a join request and a data packet of a multicast group received at the network device via a network (operation 402). The network device can execute a packet sampling mechanism, such as IPFIX, to sample packets associated with the multicast group. For example, the packet sampling mechanism can detect join requests and the initial data packet of the multicast group. Based on the detection, the network device can identify the join request and the data packet.

The join request can indicate that a client intends to receive multicast traffic of the multicast group. When the join request reaches the FHND, the join request can be processed, and a data packet can be forwarded to the network device. In this way, the data packet can reach the network device. The network device can then forward the data packet to the client. The network device can determine respective timestamps indicating the arrival and departure of the join request and the data packet (operation 404). Therefore, the network device can determine respective timestamps indicating the times when the join request is received and subsequently forwarded to the FHND. Similarly, the network device can determine respective timestamps indicating the times when the data packet is received from the FHND and subsequently forwarded to the client.

The network device can determine, based on the timestamps, at least a local latency incurred by the data packet at the network device and a network latency incurred by the data packet in the network (operation 406). Because the network device can track when the data packet is received and transmitted, the network device can determine the local latency incurred by the data packet at the network device. The network device can also determine the network latency for the data packet because it can track when the join request is sent to the FHND and when the data packet is received. The network device can maintain the latencies. If there is an issue with the multicast group causing a performance issue for the client, an administrator can initiate an mtrace of the multicast path of the multicast group. Accordingly, the network device can receive an mtrace request for the multicast group (operation 408). The mtrace request can be generated based on an mtrace query from an mtrace client (e.g., an mtrace daemon) running on an administrative device. In particular, the mtrace client can send the mtrace query to the LHND of the multicast path based on a command from an administrator.

Typically, when the network device receives an mtrace request, the network device can include the local SRB of the network device in the mtrace request. The SRB block can include the IP address of the network device and the multicast protocol of the multicast group. To facilitate an enhanced tracing of the multicast path, in addition to the SRB block, the network device can incorporate the local latency and the network latency into the mtrace request (operation 410). The network device can then determine whether there is an upstream network device in the multicast path to determine whether the tracing is complete (operation 412). If there is an upstream network device, the tracing is not complete, and the LHND is further upstream. Therefore, the network device can forward the mtrace request to the upstream network device (operation 414).

This process of forwarding upstream can continue until the mtrace request reaches the LHND, which can be indicated by the absence of an upstream network device. In other words, if there is no upstream network device, the network device is the LHND. Hence, the network device can obtain, from the multicast request, the local and network latencies of a respective network device of the multicast path (operation 416). Since the tracing is complete at the network device, the network device can generate an mtrace response corresponding to the multicast request and forward the mtrace response to the mtrace client issuing the mtrace request (operation 418). The mtrace response can comprise the obtained local and network latencies. The mtrace client can then show the latencies of obtained local and network latencies on a display of the administrative device.

Figure 4B:
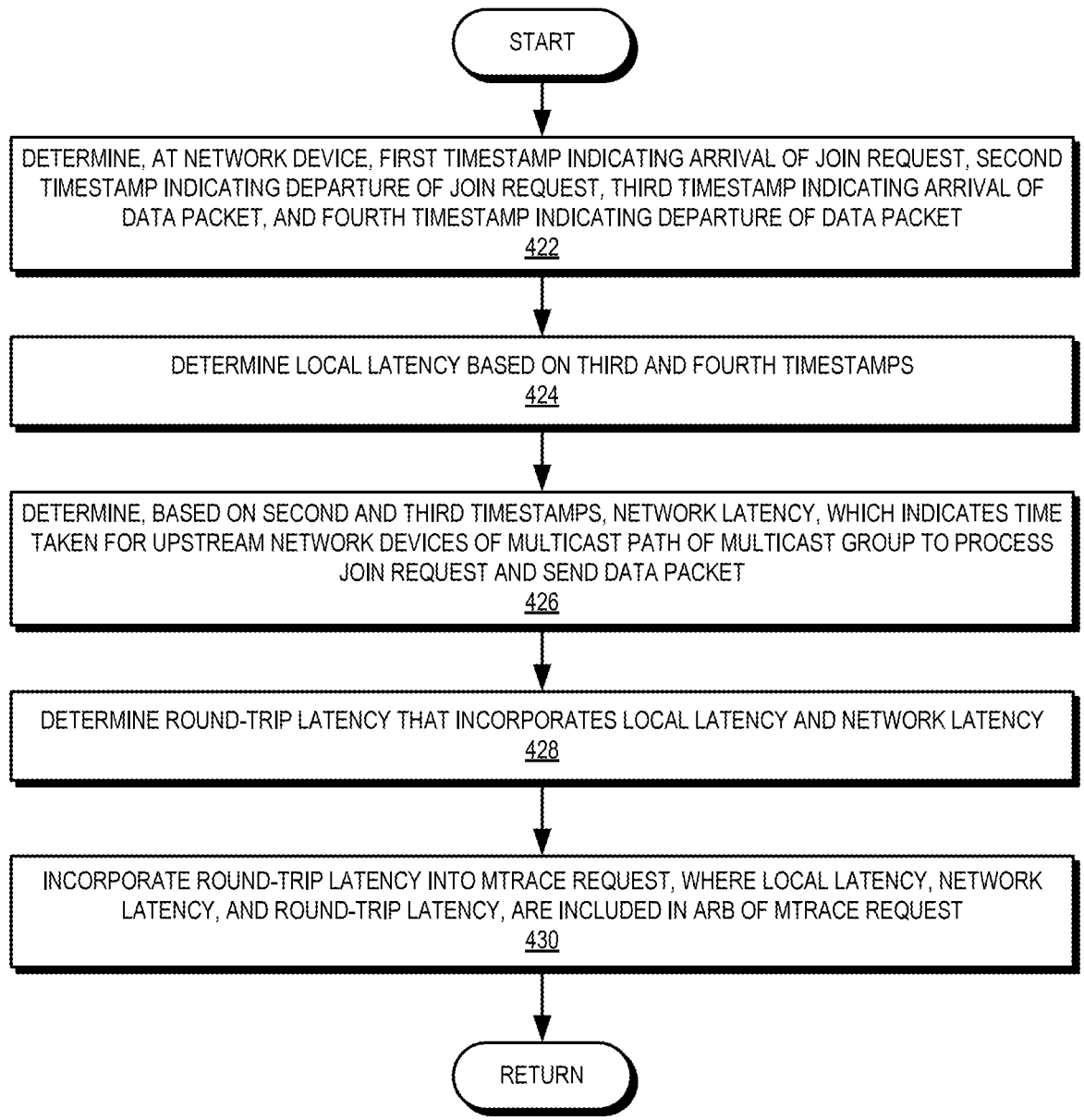
FIG. 4B presents a flowchart illustrating the process of a network device determining local, network, and round-trip latencies associated with a multicast group, in accordance with an aspect of the present application.

FIG. 4B presents a flowchart illustrating the process of a network device determining local, network, and round-trip latencies associated with a multicast group, in accordance with an aspect of the present application. During operation, the network device can determine, at the network device, a first timestamp indicating the arrival of the join request, a second timestamp indicating the departure of the join request, a third timestamp indicating the arrival of the data packet, and a fourth timestamp indicating the departure of the data packet (operation 422). The arrival of a join request or a data packet indicates the network device receiving the join request or the data packet at the respective ingress ports of the network device. On the other hand, the departure of a join request or a data packet indicates the network device transmitting the join request or the data packet from the respective egress ports of the network device.

The network device can then determine the local latency based on the third and fourth timestamps (operation 424). These timestamps indicate the arrival and departure times of the data packet at the network device. Therefore, if the third timestamp is subtracted from the fourth timestamp, the resultant latency can indicate the latency incurred by the data packet locally within the network device, such as queuing and processing delays. The network device can also determine the network latency based on the second and third timestamps (operation 426). These timestamps indicate when the network device sends the join request and receives the corresponding data packet. Consequently, if the second timestamp is subtracted from the third timestamp, the resultant latency can indicate the time taken for the upstream network device of the multicast path of the multicast group to process the join request and forward the data packet.

The network device can also determine a round-trip latency that incorporates the local latency and the network latency (operation 428). The round-trip latency can be determined by subtracting the first timestamp from the fourth timestamp. Accordingly, the round-trip latency can indicate the total time taken by the network device to receive a join request associated with a client and forward the corresponding data packet to the client. Therefore, the round-trip delay includes both the local latency and the network latency. The network device can then incorporate the round-trip latency into the mtrace request (operation 430). Here, the local latency, network latency, and the round-trip latency can be included in an ARB of the mtrace request. In this way, the mtrace request can carry these latencies to the LHND via the multicast path.

Figure 5:
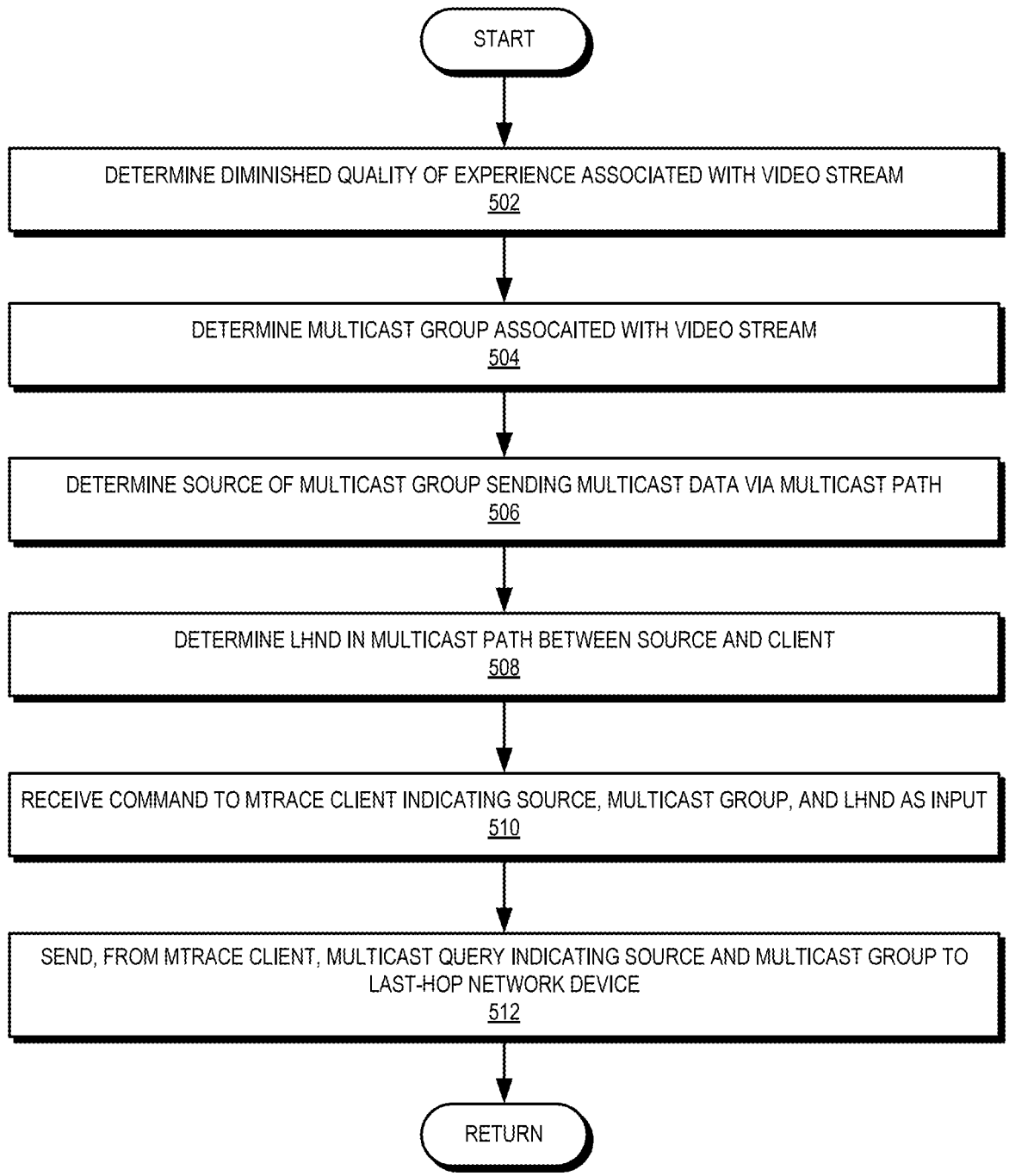
FIG. 5 presents a flowchart illustrating the process of an administrative device initiating an enhanced mtrace process in response to detecting congestion in a network, in accordance with an aspect of the present application.

FIG. 5 presents a flowchart illustrating the process of an administrative device initiating an enhanced mtrace process in response to detecting congestion in a network, in accordance with an aspect of the present application. During operation, the administrative device can determine a diminished experience associated with a video stream (e.g., an IPTV channel) (operation 502). For example, an administrator may receive, via a user interface of the administrative device, a complaint message regarding the experience (e.g., significant delays in changing channels) of a client viewing the video stream. Here, the experience of the client can indicate the diminished quality of the video stream transported via the corresponding multicast path. The video stream can be associated with a multicast group and distributed using a multicast protocol, such as PIM, via the multicast path. The video stream can be allocated to corresponding multicast groups manually by the administrator or dynamically by the administrative device (e.g., using an allocation process). Upon allocation, the administrative device can maintain a mapping between the video stream and the multicast group. The administrative device can determine the multicast group associated with the video stream (e.g., based on the mapping) (operation 504).

The administrative device can then determine the source of the multicast group sending the multicast data via the multicast path (operation 506). The administrative device can use the packets sampled at the LHND coupling the client to identify the IP address of the source. For example, when a flow sampling mechanism samples a packet, it can maintain the metadata associated with the packet. The administrative device can query the metadata to obtain the IP address of the source. In addition, based on the network connectivity of the client, the administrative device can determine the LHND in the multicast path between the source and the client (operation 508). The administrator can then initiate an enhanced multicast path tracing for the multicast group.

Accordingly, the administrative device can receive, from the administrator, an mtrace command to an mtrace client running on the administrative device (operation 510). The mtrace client can be a daemon running on the operating system of the administrative device. The command can indicate the source, multicast group, and the LHND as input. In particular, the command can obtain the respective IP address of the source, multicast group, and the LHND as input parameters. Based on the mtrace command from the administrator, the administrative device can send, from the mtrace client, an mtrace query (operation 512). The inputs to the mtrace query can include the respective IP addresses of the source, multicast group, and LHND. The administrative device 150 can then forward the mtrace query 122 toward the LHND.

Figure 6:
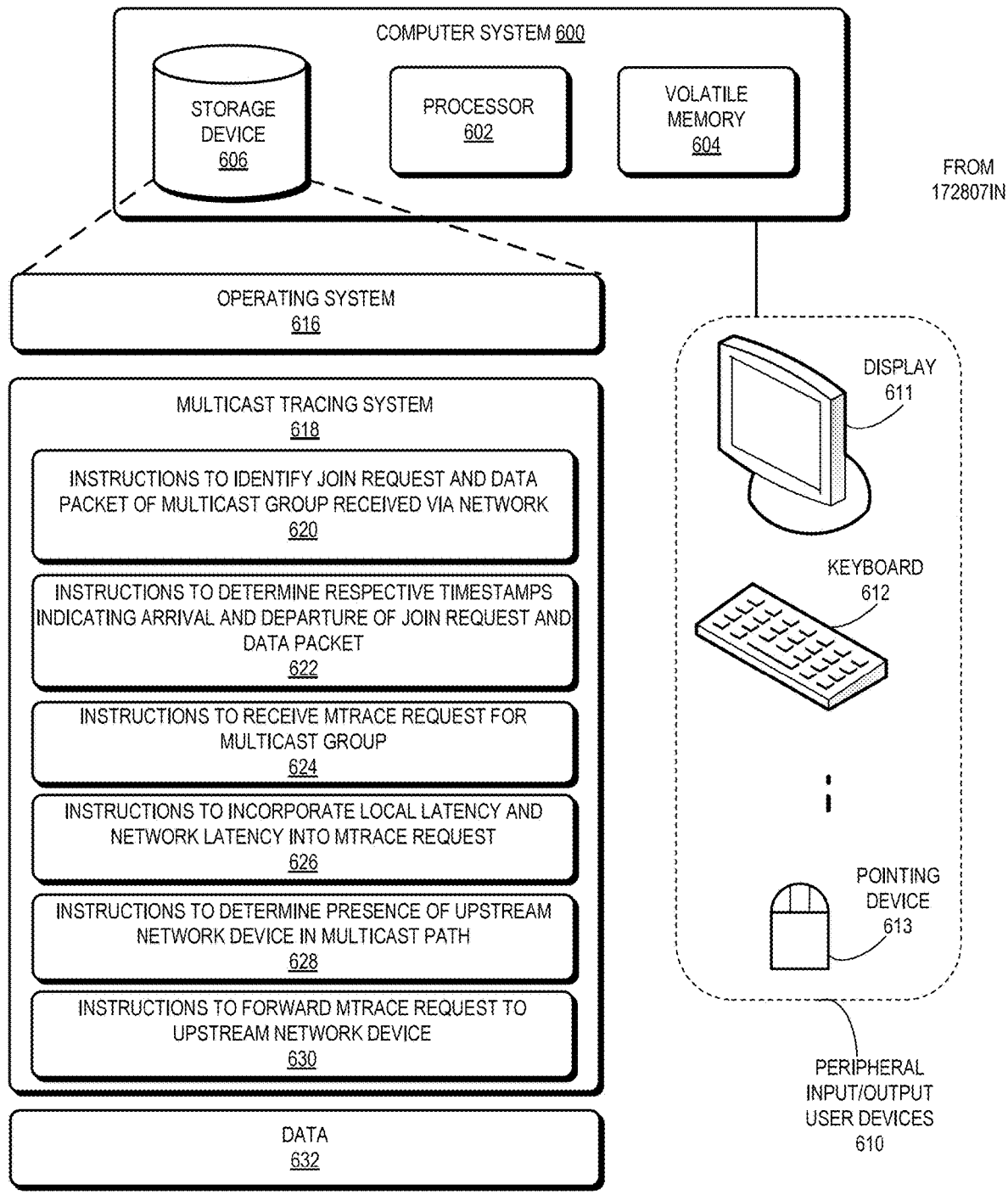
FIG. 6 illustrates an example of a computing system facilitating latency detection based on enhanced multicast tracing in a network, in accordance with an aspect of the present application.

FIG. 6 illustrates an example of a computing system facilitating latency detection based on enhanced multicast tracing in a network, in accordance with an aspect of the present application. Computer system 600 includes a processor 602, a memory 604, and a storage device 606. Memory 604 can include a volatile memory (e.g., random access memory (RAM)) that serves as a managed memory and can be used to store one or more memory pools. Furthermore, computer system 600 can be coupled to peripheral 1/O user devices 610 (e.g., a display device 611, a keyboard 612, and a pointing device 613). Storage device 606 includes a non-transitory computer-readable storage medium and stores an operating system 616, a multicast tracing system 618, and data 628. Computer system 600 may include fewer or more entities or instructions than those shown in FIG. 6.

Multicast tracing system 618 can include instructions, which when executed by computer system 600, can cause computer system 600 to perform methods and/or processes described in this disclosure. Specifically, multicast tracing system 618 may include instructions 620 to identify a join request and a data packet of a multicast group received at computer system 600 via a network. Computer system 600 can receive a join request and forward the join request to the FHND coupling the source of the multicast group. Based on the join request, computer system 600 can receive a data packet of the multicast group from the FHND. Hence, multicast tracing system 618 can also include instructions 622 to determine respective timestamps indicating the arrival and departure of the join request and the data packet. Examples of the timestamps associated with the join request and the data packet are further described in conjunction with FIGS. 2 and 3.

Multicast tracing system 618 may also include instructions 624 to receive an mtrace request for the multicast group, as described in conjunction with FIG. 1. The mtrace request can be generated based on an mtrace query from an mtrace client (e.g., an mtrace daemon) running on an administrative device. In particular, if there is an issue with the multicast group causing a performance issue for the client, an administrator can initiate the mtrace at the mtrace client, which can then send the mtrace query, as described in conjunction with FIG. 3.

Multicast tracing system 618 may include instructions 626 to incorporate the local latency and the network latency into the mtrace request, as described in conjunction with FIG. 1. Because computer system 600 can track when the data packet is received and transmitted, computer system 600 can determine the local latency incurred by the data packet at computer system 600. Computer system 600 can also determine the network latency for the data packet because computer system 600 can track when the join request is sent to the FHND and the data packet is received, as described in conjunction with FIG. 3.

Multicast tracing system 618 may include instructions 628 to determine the presence of an upstream network device in the multicast path. If there is an upstream network device, the tracing is not complete, and the LHND is further upstream. Multicast tracing system 618 can then include instructions 630 to forward the mtrace request to the upstream network device, as described in conjunction with FIG. 1.

Data 632 can include any data that is required as input, or that is generated as output by the methods, operations, communications, and/or processes described in this disclosure. Specifically, data 632 can include flow sampling information, such as metadata, associated with the join request and data packet received for the multicast group and the respective timestamps indicating the arrival and departure of the join request and the data packet. Data 628 can also store parameter values provided to initiate the mtrace, such as the respective IP addresses of the source, multicast group, and LHND. If computer system 600 is the LHND, data 628 can also include the accumulated latency information of the multicast path.

Computer system 600 and multicast tracing system 618 may include more instructions than those shown in FIG. 6. For example, multicast tracing system 618 can also store instructions for executing the operations described above in relation to: the accumulation of latency information in the mtrace request of FIG. 1; sending an mtrace response comprising the accumulated latency information of FIG. 1; calculation of network latency, local latency, and round-trip latency of FIG. 2; the mtrace command and visual representation of the latency information of FIG. 3; and the operations depicted in the flowcharts of FIGS. 4A-4B and 5; and the instructions of non-transitory CRM 700 in FIG. 7.

Figure 7:
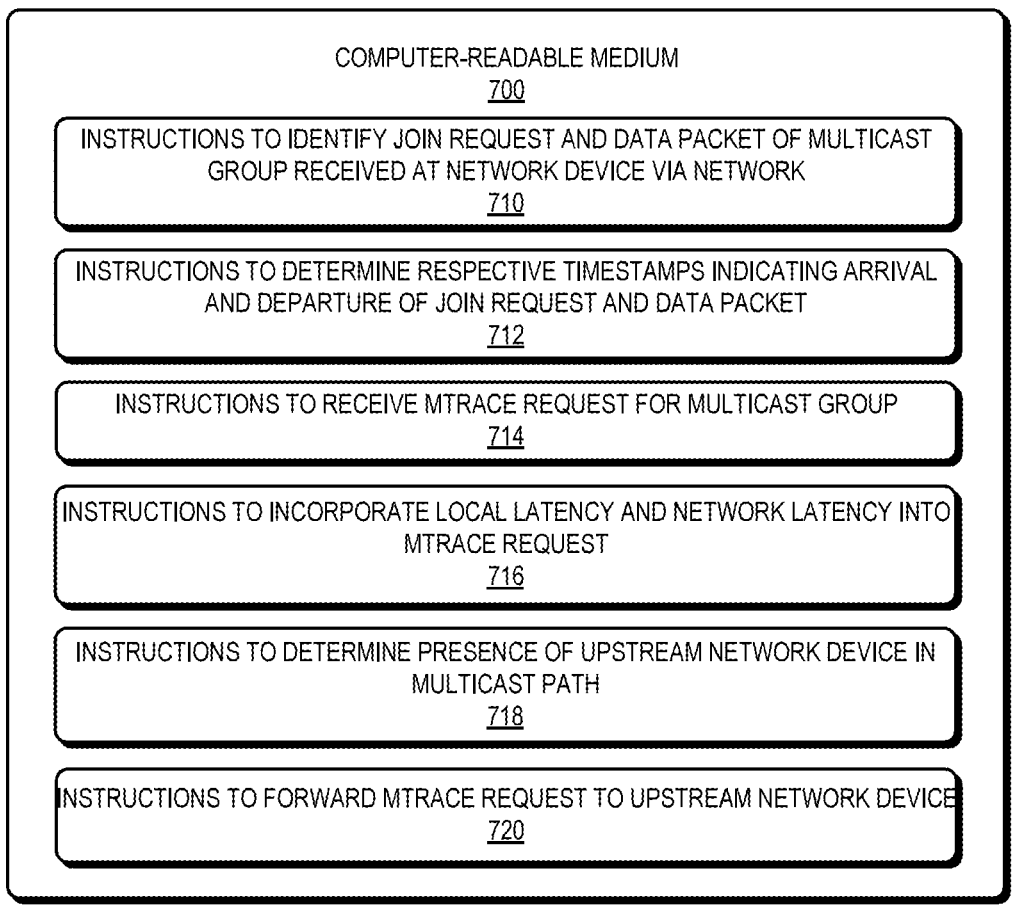
FIG. 7 illustrates an example of a computer-readable medium (CRM) facilitating latency detection based on enhanced multicast tracing in a network, in accordance with an aspect of the present application.

FIG. 7 illustrates an example of a CRM facilitating latency detection based on enhanced multicast tracing in a network, in accordance with an aspect of the present application. CRM 700 can be a non-transitory computer-readable medium or device storing instructions that when executed by a computer or processor cause the computer or processor to perform a method. CRM 700 can store instructions 710 to identify a join request and a data packet of a multicast group received at a network device via a network, as described above in relation to the join request and the multicast data of FIG. 2.

CRM 700 can also include instructions 712 to determine respective timestamps indicating the arrival and departure of the join request and the data packet, as described above in relation to timestamps $T_1$, $T_2$, $T_3$, and $T_4$ of FIGS. 2 and 3. CRM 700 can include instructions 714 to receive an mtrace request for the multicast group, as described above in relation to mtrace requests 132, 134, and 136 of FIG. 1.

CRM 700 can additionally include instructions 716 to incorporate the local latency and the network latency into the mtrace request, as described above in relation to latencies 142, 144, 146, and 148 of FIG. 1. CRM 700 can include instructions 718 to determine the presence of an upstream network device in the multicast path, as described above in relation to multicast path 130 of FIG. 1. CRM 700 can also include instructions 720 to forward the mtrace request to the upstream network device, as described above in relation to network devices 118, 116, and 114 of FIG. 1.

CRM 700 may include more instructions than those shown in FIG. 7. For example, multicast tracing system 618 can also store instructions for executing the operations described above in relation to: the accumulation of latency information in the mtrace request of FIG. 1; sending an mtrace response comprising the accumulated latency information of FIG. 1; calculation of network latency, local latency, and round-trip latency of FIG. 2; the mtrace command and visual representation of the latency information of FIG. 3; and the operations depicted in the flowcharts of FIGS. 4A-4B and 5; and the instructions of computer system 600 in FIG. 6.

The description herein is presented to enable any person skilled in the art to make and use the invention and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown but is to be accorded the widest scope consistent with the claims.

One aspect of the present technology can provide a multicast tracing system for a network. During operation, the system can identify, at a network device in the network, a join request and a data packet of a multicast group received at the network device. The system can determine respective timestamps indicating the arrival and departure of the join request and the data packet. The system can then determine, based on the timestamps, at least a local latency incurred by the data packet at the network device and a network latency incurred by the data packet in the network. Subsequently, the system can receive a multicast trace (mtrace) request for the multicast group. The system can incorporate the local latency and the network latency into the mtrace request. Upon identifying an upstream network device in a multicast path associated with the multicast group, the system can forward the mtrace request to the upstream network device.

In a variation on this aspect, if the network device is a first hop network device of the multicast path, the system can obtain, from the multicast request, local and network latencies of a respective network device of the multicast path. The system can then generate an mtrace response comprising the obtained local and network latencies corresponding to the multicast request. Subsequently, the system can forward the mtrace response to an mtrace client issuing the mtrace request.

In a variation on this aspect, the system can determine, at the network device, a round-trip latency that incorporates the local latency and the network latency. The system can then incorporate the round-trip latency into the mtrace request.

In a variation on this aspect, the system can execute, at the network device, a packet sampling mechanism that samples packets associated with the multicast group. The system can then identify the join request and the data packet based on the packet sampling mechanism.

In a variation on this aspect, the timestamps can include a first timestamp indicating the arrival of the join request at the network device, a second timestamp indicating the departure of the join request from the network device, a third timestamp indicating the arrival of the data packet at the network device, and a fourth timestamp indicating the departure of the data packet from the network device.

In a further variation, the system can determine the local latency based on the third and fourth timestamps. Furthermore, the system can determine the network latency based on the second and third timestamps.

In a further variation, the network latency can indicate a time taken for upstream network devices on the multicast path to process the join request and send the data packet.

In a variation on this aspect, the system can include the local latency and the network latency in an augmented response block (ARB) of the mtrace request.

In a variation on this aspect, wherein the join request can be one of: an Internet Group Management Protocol (IGMP) or a Multicast Listener Discovery (MLD) request from a client device, and a Protocol-Independent Multicast (PIM) request from a second network device.

In a variation on this aspect, the mtrace request can originate from an mtrace client running on an administrative device based on a quality of experience associated with the multicast path.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
   identifying, by a network device in a network, a join request and a data packet of a multicast group received at the network device;
   determining respective timestamps indicating arrival and departure of the join request and the data packet;
   determining, based on the timestamps, at least a local latency incurred by the data packet at the network device and a network latency incurred by the data packet in the network;
   receiving a multicast trace (mtrace) request for the multicast group;
   incorporating the local latency and the network latency into the mtrace request; and
   in response to identifying an upstream network device in a multicast path associated with the multicast group, forwarding the mtrace request to the upstream network device.

2. The method of claim 1, wherein, in response to the network device being a first hop network device of the multicast path, the method further comprises:
   obtaining, from the multicast request, local and network latencies of a respective network device of the multicast path;
   generating an mtrace response comprising the obtained local and network latencies corresponding to the multicast request; and
   forwarding the mtrace response to the mtrace client issuing the mtrace request.

3. The method of claim 1, further comprising:
   determining, at the network device, a round-trip latency that incorporates the local latency and the network latency; and
   incorporating the round-trip latency into the mtrace request.

4. The method of claim 1, further comprising:
   executing, at the network device, a packet sampling mechanism that samples packets associated with the multicast group; and
   identifying the join request and the data packet based on the packet sampling mechanism.

5. The method of claim 1, wherein the timestamps include:
   a first timestamp indicating arrival of the join request at the network device;
   a second timestamp indicating departure of the join request from the network device;
   a third timestamp indicating arrival of the data packet at the network device; and
   a fourth timestamp indicating departure of the data packet from the network device.

6. The method of claim 5, further comprising:
   determining the local latency based on the third and fourth timestamps; and
   determining the network latency based on the second and third timestamps.

7. The method of claim 5, wherein the network latency indicates a time taken for upstream network devices on the multicast path to process the join request and send the data packet.

8. The method of claim 1, further comprising including the local latency and the network latency in an augmented response block (ARB) of the mtrace request.

9. The method of claim 1, wherein the join request is one of:
   an Internet Group Management Protocol (IGMP) or a Multicast Listener Discovery (MLD) request from a client device; and
   a Protocol-Independent Multicast (PIM) request from a second network device.

10. The method of claim 1, wherein the mtrace request is originated from an mtrace client running on an administrative device based on a quality of experience associated with the multicast path.

11. A non-transitory computer-readable medium storing instructions to:
   identify, by a network device in a network, a join request and a data packet of a multicast group received at the network device;
   determine respective timestamps indicating arrival and departure of the join request and the data packet;
   determine, based on the timestamps, at least a local latency incurred by the data packet at the network device and a network latency incurred by the data packet in the network;
   receive a multicast trace (mtrace) request for the multicast group;
   incorporate the local latency and the network latency into the mtrace request; and
   in response to identifying an upstream network device in a multicast path associated with the multicast group, forward the mtrace request to the upstream network device.

12. The non-transitory computer-readable storage medium of claim 11, wherein, in response to the network device being a first hop network device of the multicast path, the instructions are further to:
   obtain, from the multicast request, local and network latencies of a respective network device of the multicast path;
   generate an mtrace response comprising the obtained local and network latencies corresponding to the multicast request; and
   forward the mtrace response to an mtrace client issuing the mtrace request.

13. The non-transitory computer-readable storage medium of claim 11, wherein the instructions are further to:
   determine, at the network device, a round-trip latency that incorporates the local latency and the network latency; and
   incorporate the round-trip latency into the mtrace request.

14. The non-transitory computer-readable storage medium of claim 11, wherein the instructions are further to:
   execute, at the network device, a packet sampling mechanism that samples packets associated with the multicast group; and
   identify the join request and the data packet based on the packet sampling mechanism.

15. The non-transitory computer-readable storage medium of claim 11, wherein the timestamps include:
   a first timestamp indicating arrival of the join request at the network device;
   a second timestamp indicating departure of the join request from the network device;
   a third timestamp indicating arrival of the data packet at the network device; and
   a fourth timestamp indicating departure of the data packet from the network device.

16. The non-transitory computer-readable storage medium of claim 15, wherein the instructions are further to:
   determine the local latency based on the third and fourth timestamps; and
   determine the network latency based on the second and third timestamps.

17. The non-transitory computer-readable storage medium of claim 15, wherein the network latency indicates a time taken for upstream network devices on the multicast path to process the join request and send the data packet.

18. The non-transitory computer-readable storage medium of claim 11, wherein the instructions are further to include the local latency and the network latency in an augmented response block (ARB) of the mtrace request.

19. The non-transitory computer-readable storage medium of claim 11, wherein the mtrace request is originated from an mtrace client running on an administrative device based on a quality of experience associated with the multicast path.

20. A computer system, comprising:
   a processing resource;
   a non-transitory computer-readable storage medium storing instructions that when executed by the processing resource cause the computer system to:
      identify a join request and a data packet of a multicast group received at the computer system;
      determine respective timestamps indicating arrival and departure of the join request and the data packet;
      determine, based on the timestamps, at least a local latency incurred by the data packet at the network device and a network latency incurred by the data packet in the network;
      receive a multicast trace (mtrace) request for the multicast group;
      incorporate the local latency and the network latency into the mtrace request; and
      in response to identifying an upstream device in a multicast path associated with the multicast group, forward the mtrace request to the upstream device.

* * * * *